United States Patent
Tajima

(10) Patent No.: US 9,620,977 B2
(45) Date of Patent: Apr. 11, 2017

(54) BATTERY DEVICE FOR A SCALABLE POWER SYSTEM

(71) Applicant: Sony Corporation, Tokyo (JP)

(72) Inventor: Shigeru Tajima, Kanagawa (JP)

(73) Assignee: SONY CORPORATION, Tokyo (JP)

(*) Notice: Subject to any disclaimer, the term of this patent is extended or adjusted under 35 U.S.C. 154(b) by 265 days.

(21) Appl. No.: 14/369,477

(22) PCT Filed: Jan. 9, 2013

(86) PCT No.: PCT/JP2013/000027
§ 371 (c)(1),
(2) Date: Jun. 27, 2014

(87) PCT Pub. No.: WO2013/105491
PCT Pub. Date: Jul. 18, 2013

(65) Prior Publication Data
US 2014/0361727 A1    Dec. 11, 2014

(30) Foreign Application Priority Data

Jan. 11, 2012    (JP) ................. 2012-003267

(51) Int. Cl.
| | | |
|---|---|---|
| H01M 10/44 | (2006.01) | |
| H02J 7/00 | (2006.01) | |
| H02J 1/14 | (2006.01) | |
| H02J 7/34 | (2006.01) | |

(52) U.S. Cl.
CPC .............. *H02J 7/0054* (2013.01); *H02J 1/14* (2013.01); *H02J 7/007* (2013.01); *H02J 7/0013* (2013.01); *H02J 7/34* (2013.01); *H02J 2007/0059* (2013.01)

(58) Field of Classification Search
CPC ...... H02J 7/0004; H02J 7/0006; H02J 7/0018; H02J 7/0019; H02J 7/0021; H02J 7/0024
USPC ................ 320/107, 111, 116, 128, 138, 140; 307/11, 18, 19, 20, 43, 45
See application file for complete search history.

(56) References Cited

U.S. PATENT DOCUMENTS

| | | | |
|---|---|---|---|
| 2011/0006603 A1* | 1/2011 | Robinson ................ | G06F 1/263 307/31 |
| 2011/0175565 A1 | 7/2011 | Lee | |
| 2012/0173035 A1* | 7/2012 | Abe .......................... | H02J 3/00 700/297 |

FOREIGN PATENT DOCUMENTS

| | | |
|---|---|---|
| JP | 2001-306191 | 11/2001 |
| JP | 2008-123051 | 5/2008 |
| JP | 2011-223651 | 11/2011 |
| WO | 2011/046645 | 4/2011 |

OTHER PUBLICATIONS

Written Opinion of the International Searching Authority issued in connection with International Application No. PCT/JP2013/000027, dated Apr. 29, 2013. (8 pages).

(Continued)

*Primary Examiner* — Edward Tso
(74) *Attorney, Agent, or Firm* — Chip Law Group

(57) ABSTRACT

A battery device includes a plurality of power converters, and a power storage unit connected between the power converters. The power converters and the power storage unit are configured to convert power from a first power standard to a second power standard by transferring the power through the power storage unit.

19 Claims, 9 Drawing Sheets

(56) References Cited

OTHER PUBLICATIONS

International Search Report of the International Searching Authority issued in connection with International Application No. PCT/JP2013/000027, dated Apr. 29, 2013. (3 pages).

* cited by examiner

BATTERY DEVICE FOR A SCALABLE POWER SYSTEM

CROSS REFERENCES TO RELATED APPLICATIONS

The present application is a national stage of International Application No. PCT/JP2013/000027 filed on Jan. 9, 2013 and claims priority to Japanese Patent Application No. 2012-003267 filed on Jan. 11, 2012, the disclosure of which is incorporated herein by reference.

BACKGROUND

The present disclosure relates to a battery device.

An alternating current is generated in a power plant to generate power and the alternating current is transmitted through a power line. The alternating current is converted into a direct current in an adapter or an electronic apparatus and is then used. However, the direct current is preferably supplied to the electronic apparatus, in terms of efficiency. Therefore, technology relating to direct-current power supply has developed.

Recently, with a surge of a power demand, power generation using natural energy such as solar power generation or wind power generation has attracted attention. However, because power generated by a solar battery is a direct current, after the direct current is converted into an alternating current, the alternating current should be converted into the direct current again, and this is inefficient. Therefore, supply of the direct-current power becomes more important in the future.

A power supply bus system in which a power supply block to supply power to an apparatus such as a battery or an AC adapter and a power consumption block receiving the power from the power supply block are connected to one common bus line for a direct current has been suggested (for example, refer to Patent Literatures 1 and 2). In such a power supply bus system, the direct current flows through the bus line. In the power supply bus system, the individual blocks are described as objects and the objects of the individual blocks mutually exchange information (state data) through the bus line. The object of each block generates information (state data) on the basis of a request from the object of the other block and transmits the information as reply data. The object of the block that has received the reply data can control supply or consumption of power, on the basis of the content of the received reply data.

CITATION LIST

Patent Literature

PTL 1: JP 2001-306191A
PTL 2: JP 2008-123051A

SUMMARY

Technical Problem

In the related art, there is no structure to mutually connect power supply bus systems operated according to different standards (standards of a voltage specification, a current capacity, a communication physical layer, and a communication protocol). For this reason, the power supply bus systems that are operated according to the different standards may not be mutually connected in the related art. When the power supply bus systems operated according to the different standards are mutually connected, it is preferable to easily connect the power supply bus systems without considering a difference of the standards. In addition, it can be expected that a scalable power system can be constructed by facilitating mutual connection of the power supply bus system operated according to the different standards.

It is desirable to provide a battery device that enables construction of a scalable power system by facilitating mutual connection of a plurality of power systems.

Solution to Problem

According to an embodiment of the present disclosure, there is provided a battery device including a plurality of power converters, and a power storage unit connected between the power converters. The power converters and the power storage unit are configured to convert power from a first power standard to a second power standard by transferring the power through the power storage unit.

According to the embodiment of the present disclosure, the power storage unit stores power and each of the plurality of power converting units is connected to a power line supplied with power according to a predetermined standard and converts the power supplied to the power line into power according to a standard of the power storage unit. Each of the plurality of power input/output units is paired with each power converting unit, such that power is input and output between the power converting unit and the power storage unit. As a result, the battery device enables construction of a scalable power system by easily connecting a plurality of power systems to each other.

According to another embodiment, a battery system includes a plurality of power cells, and a battery device connected between the power cells. Each battery device includes a plurality of power converters, and a power storage unit connected between the power converters. The power converters and the power storage unit are configured to convert power from a first power standard according to a first power cell to a second power standard according to a second power cell by transferring the power through the power storage unit.

According to another embodiment, a method of converting power via a power storage unit includes converting power from a first power standard, storing the converted power in a power storage unit, and converting the previously stored power to a second power standard.

Advantageous Effects of Invention

According to the embodiments of the present disclosure described above, a battery device that enables construction of a scalable power system by easily connecting a plurality of power systems to each other can be provided.

Additional features and advantages are described herein, and will be apparent from the following Detailed Description and the figures.

DETAILED DESCRIPTION

Figure 1:
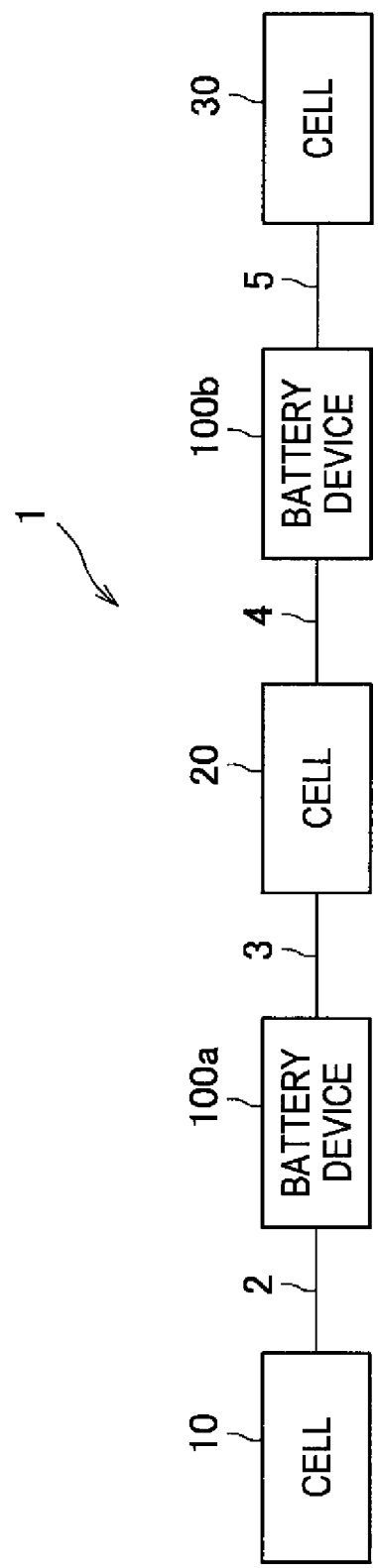
FIG. 1 is a diagram illustrating a configuration example of a power transmission/distribution system 1 according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.

<1. Embodiment of Present Disclosure>
(Configuration Example of Power Transmission/Distribution System)
(Functional Configuration of Battery Device)
(Application Example of Power Transmission/Distribution System)
<2. Summary>

1. Embodiment of Present Disclosure

Configuration Example of Power Transmission/Distribution System

First, a schematic configuration of a power transmission/distribution system according to an embodiment of the present disclosure will be described. FIG. 1 is a diagram illustrating a configuration example of a power transmission/distribution system 1 according to the embodiment of the present disclosure. Hereinafter, the configuration example of the power transmission/distribution system 1 according to the embodiment of the present disclosure will be described using FIG. 1.

As illustrated in FIG. 1, the power transmission/distribution system 1 according to the embodiment of the present disclosure includes cells 10, 20, and 30 and battery devices 100a and 100b.

In this embodiment, an object that includes a power source generating power, a load consuming the power generated by the power source, a power line supplying the power from the power source to the load, a power storage function for storing the power generated by the power source, and a communication line used for communication between the power source, the load, and the battery is defined as a cell. The cell is an example of a power generation block of the present disclosure. The communication line may be provided separately from the power line and may be the same line as the power line. The power storage function functions as the load when the power is stored and functions as the power source when the power is supplied.

In this embodiment, the three cells 10, 20, and 30 are illustrated. In this embodiment, in the three cells, power is generated by the power source, according to different standards. In the three cells, communication between the power source, the load, and the battery is performed according to the different standards.

Each of the battery devices 100a and 100b stores power and supplies the stored power to the load. In this embodiment, each of the battery devices 100a and 100b includes at least two power input/output ports to connect the different cells. For example, the battery device 100a includes at least two power input/output ports to connect the cells 10 and 20. Likewise, the battery device 100b includes at least two power input/output ports to connect the cells 20 and 30.

Although a specific configuration example of the battery devices 100a and 100b is described below, the battery devices 100a and 100b include power lines of two sets or more and have a function of converting a difference of physical specifications of the connected cells. The battery devices 100a and 100b include communication lines of two sets or more and have a function of absorbing a difference of communication specifications of the connected cells and relaying communication between the different cells.

FIG. 1 illustrates a state in which the cell 10 and the battery device 100a are connected by a bus line 2, the cell 20 and the battery device 100a are connected by a bus line 3, the cell 20 and the battery device 100b are connected by a bus line 4, and the cell 30 and the battery device 100b are connected by a bus line 5.

Figure 2:
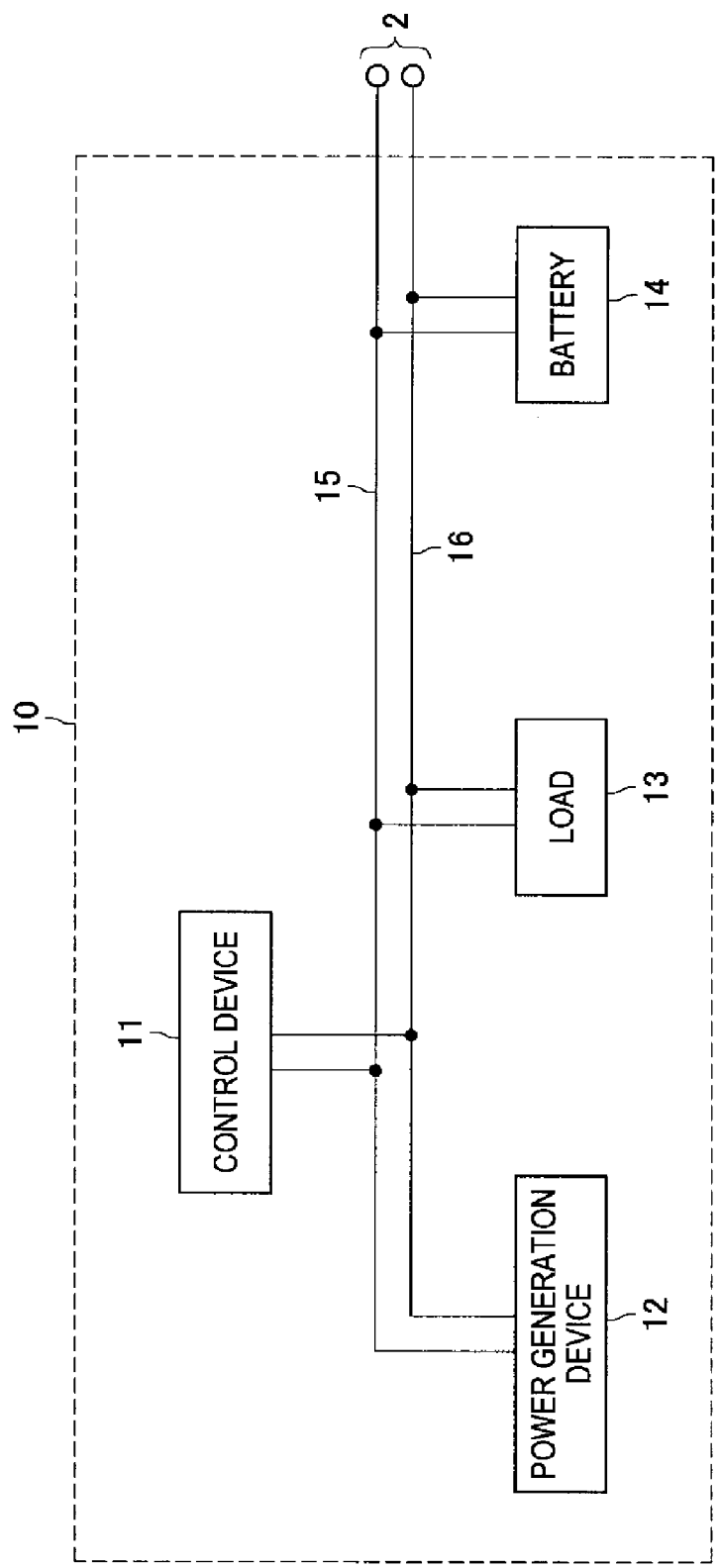
FIG. 2 is a diagram illustrating a configuration example of a cell 10 included in the power transmission/distribution system 1 according to the embodiment of the present disclosure.

In this case, a configuration example of the cells that are included in the power transmission/distribution system 1 according to the embodiment of the present disclosure will be described. FIG. 2 is a diagram illustrating a configuration example of the cell 10 included in the power transmission/distribution system 1 according to the embodiment of the present disclosure. Hereinafter, the configuration example of the cell 10 that is included in the power transmission/distribution system 1 according to the embodiment of the present disclosure will be described using FIG. 2.

As illustrated in FIG. 2, the cell 10 that is included in the power transmission/distribution system 1 according to the embodiment of the present disclosure includes a control device 11, a power generation device 12, a load 13, a battery device 14, a power line 15, and a communication line 16. The power line 15 and the communication line 16 form the bus line 2.

The control device 11 executes power transmission/distribution control with respect to the power generation device 12, the load 13, and the battery device 14. The power transmission/distribution control that is executed by the control device 11 is not limited to a predetermined method. For example, the control device 11 executes control to determine supply timing of the power generated by the power generation device 12 or determine the priority of the power supply. The control device 11 executes communication using the communication line 16 between the power generation device 12, the load 13, and the battery device 14 and executes the power transmission/distribution control. Each of the power generation device 12, the load 13, and the battery device 14 has unique identification information, such that the control device 11 executes the power transmission/distribution control with respect to the power generation device 12, the load 13, and the battery device 14. The identification information may be unique information like a MAC address and may be information becoming unique in a predetermined range like an IP address.

The power generation device 12 that is a device to generate power of a predetermined specification is configured using a solar battery, a wind power generator, or an input power generator. The power that is generated by the power generation device 12 may be direct-current power or alternating-current power. However, it is preferable to generate the direct-current power, in terms of efficiency. The power that is generated by the power generation device 12 is supplied to the control device 11, the load 13, and the battery device 14 through the power line 15.

The load 13 is a device that consumes power of a predetermined specification generated by the power generation device 12. For example, the load 13 is configured using a general electric device. The load 13 receives the power generated by the power generation device 12 through the power line 15 and operates. The load 13 performs communication using the communication line 16 between the control device 11 and the load 13 and is subjected to the power transmission/distribution control by the control device 11.

The battery device 14 stores the power of the predetermined specification generated by the power generation device 12 or discharges the stored power. The battery device 14 receives the power generated by the power generation device 12 through the power line 15, under the control of the control device 11, and stores the power. The battery device 14 supplies the stored power through the power line 15, under the control of the control device 11.

A device supplied with the power generated by the power generation device 12 and a power supply time may be determined on the basis of the control of the control device 11. When the power is supplied on the basis of the control of the control device 11, a negotiation is performed by communication using the communication line 16 between the power generation device 12 and the device (for example, load 13) using the power, under the control of the control device 11. The control device 11 controls the power generation device 12 and the load 13, such that power of a specification desired by the load 13 is output from the power generation device 12 to the power line 15.

FIG. 2 shows a state in which the communication line 16 is provided separately from the power line 15. However, a function of the communication line 16 may be provided in the power line 15. The communication line 16 may be a line for wired communication. However, communication between the control device 11, the power generation device 12, the load 13, and the battery device 14 may be wireless communication.

The configuration example of the cell 10 that is included in the power transmission/distribution system 1 according to the embodiment of the present disclosure has been described. Next, a functional configuration of the battery device 100a that is used by the power transmission/distribution system 1 according to the embodiment of the present disclosure will be described.

(Functional Configuration of Battery Device)

Figure 3:
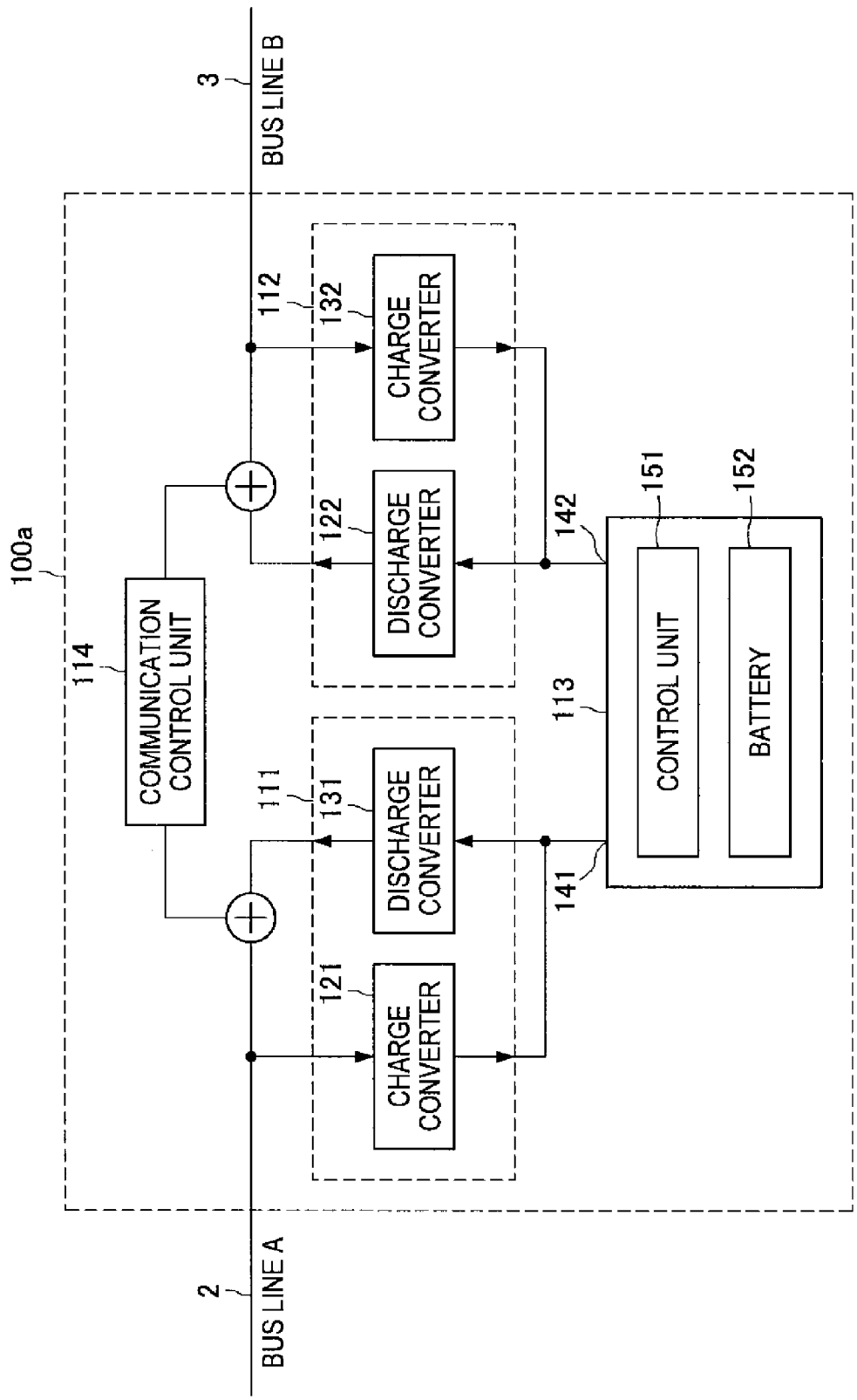
FIG. 3 is a diagram illustrating a functional configuration of a battery device 100a used by the power transmission/distribution system 1 according to the embodiment of the present disclosure.

FIG. 3 is a diagram illustrating the functional configuration of the battery device 100a used by the power transmission/distribution system 1 according to the embodiment of the present disclosure. Hereinafter, the functional configuration of the battery device 100a will be described using FIG. 3.

As illustrated in FIG. 3, the battery device 100a according to the embodiment of the present disclosure includes power converting units 111 and 112, a power storage unit 113, and a communication control unit 114.

The power converting unit 111 converts power transmitted from the cell 10 through the bus line 2, according to a physical specification of the power storage unit 113, and converts power transmitted from the power storage unit 113 to the cell 10 through the bus line 2, according to a physical specification of the cell 10. Likewise, the power converting unit 112 converts power transmitted from the cell 20 through the bus line 3, according to the physical specification of the power storage unit 113, and converts power transmitted from the power storage unit 113 through the bus line 3 to the cell 20, according to a physical specification of the cell 20.

The power converting unit 111 includes a charge converter 121 and a discharge converter 131. Likewise, the power converting unit 112 includes a charge converter 122 and a discharge converter 132.

The charge converter 121 converts power transmitted from the cell 10 through the bus line 2, according to the physical specification of the power storage unit 113. For example, when the power storage unit 113 is configured to store power of 12 V and the power transmitted from the cell 10 through the bus line 2 is 48 V, the charge converter 121 down-converts the power from 48 V to 12 V. The discharge converter 131 converts power transmitted from the power storage unit 113 to the cell 10 through the bus line 2, according to the physical specification of the cell 10. In the example described above, the discharge converter 131 up-converts the power from 12 V to 48 V.

Likewise, the charge converter 122 converts the power transmitted from the cell 20 through the bus line 3, according to the physical specification of the power storage unit 113. For example, when the power storage unit 113 is configured to store power of 12 V and the power transmitted from the cell 10 through the bus line 2 is 60 V, the charge converter 122 down-converts the power from 60 V to 12 V. The discharge converter 132 converts power transmitted from the power storage unit 113 to the cell 30 through the bus line 3, according to the physical specification of the cell 20. In the example described above, the discharge converter 132 up-converts the power from 12 V to 60 V.

The power storage unit 113 stores power according to a predetermined specification. The power storage unit 113 can store the power transmitted from the cells 10 and 20 through the bus lines 2 and 3 or supply the power to the cells 10 and 20 through the bus lines 2 and 3. The power storage unit 113 can absorb a difference of the physical specifications of the powers of the cells 10 and 20, through the power converting units 111 and 112. In the present disclosure, the power specifications of the cells 10 and 20 may be the same. By connecting the cells having the same power specifications by the battery device 100a, a scalable power system can be easily constructed.

The power storage unit 113 includes at least two power input/output ports 141 and 142 to connect the cells 10 and 20. The battery device 100a is recognized as one power storage device, when viewed from the cell 10. Likewise, the battery device 100a is recognized as one power storage device, when viewed from the cell 20. Therefore, in the battery device 100a, each of the two power input/output ports 141 and 142 of the power storage unit 113 has unique identification information.

The power storage unit 113 includes a control unit 151 and a battery 152. The control unit 151 controls an operation of the battery device 100a and controls charging with respect to the battery device 100a and discharging from the battery device 100a, by communication with the cells 10 and 20. The battery 152 is a secondary battery that can store power.

The communication control unit 114 relays communication between the cells 10 and 20. If communication protocols of the cells 10 and 20 are equal to each other, the communication control unit 114 relays the communication between the cells 10 and 20 without a conversion of the protocols. If the communication protocols of the cells 10 and 20 are different from each other, the communication control unit 114 converts the protocols and relays the communication. In this embodiment, the control unit 151 and the communication control unit 114 are provided separately from each other. However, the present disclosure is not limited to the above example and the control unit 151 and the communication control unit 114 may be integrated with each other.

FIG. 3 illustrates the power input/output ports 141 and 142 to supply power to the power storage unit 113 and receive power from the power storage unit 113. However, the power supply with respect to the power storage unit 113 and the power reception from the power storage unit 113 may be performed by non-contact feeding.

In FIG. 3, the configuration of the battery device 100a that is connected between the cells 10 and 20 is illustrated. The configuration illustrated in FIG. 3 is the same as the configuration of the battery device 100b that is connected between the cells 20 and 30. The functional configuration of the battery device 100a that is used by the power transmission/distribution system 1 according to the embodiment of the present disclosure has been described. Next, an operation of the battery device 100a that is used by the power transmission/distribution system 1 according to the embodiment of the present disclosure will be described.

(Operation of Battery Device)

As described above, the battery device 100a is recognized as one power storage device, when viewed from the cell 10, and the battery device 100a is recognized as one power storage device, when viewed from the cell 20. If the battery device 100a is connected to the bus line 2, one address is provided by the control device 11 of the cell 10. An address provision object is the power input/output port 141. Likewise, if the battery device 100a is connected to the bus line 3, one address is provided by a control device (not illustrated in the drawings) of the cell 20. An address provision object is the power input/output port 142.

Each cell has a function of regularly monitoring presence or absence of a device connected by the bus line, by the control device. If the control device 11 regularly executes polling and detects that the battery device 100a is connected to the bus line 2, the control device 11 provides an address to the battery device 100a. If the communication control unit 114 detects that the address is provided to the battery device 100a by the control device 11 of the cell 10, the communication control unit 114 holds information to recognize that the battery device 100a is connected to the cell 10.

If the battery device 100a is disconnected from the bus line 2, the control device 11 deletes the battery device 100a from elements of the cell 10. The communication control unit 114 can recognize that the battery device 100a is disconnected from the bus line 2, by non-delivery of a polling signal from the control device 11. In this case, the communication control unit 114 may delete information to recognize that the battery device 100a is connected to the cell 10.

If the battery device 100a is connected to the bus line 2 and the power generated by the power generation device 12 of the cell 10 is supplied to the battery device 100a by the control of the control device 11, the battery device 100a converts the power generated by the power generation device 12 by the charge converter 121 and stores the power in the battery 152. Likewise, if the battery device 100a is connected to the bus line 3 and power generated by a power generation device (not illustrated in the drawings) of the cell 20 is supplied to the battery device 100a by the control of a control device (not illustrated in the drawings), the battery device 100a converts the power generated by the power generation device (not illustrated in the drawings) by the charge converter 122 and stores the power in the battery 152.

The control unit 151 transmits power management information such as a charge current, a charge voltage, and a charge amount with respect to the battery 152, to the cell 10 connected to the bus line 2 or the cell 20 connected to the bus line 3 at predetermined timing. Each cell receives the power management information transmitted from the control unit 151 by the control device and manages the power supply of the battery device 100a. Because the battery device 100a relays the communication between the cells 10 and 20, each cell can know a situation of the other cell connected through the battery device 100a.

For example, when an amount of power generated by the power generation device is sufficient in the cell 10, but an amount of power generated by the power generation device is insufficient in the cell 20, the cell 10 can supply the power to the cell 20 through the battery device 100a. That is, the cell 10 transmits the power to the battery device 100a and stores the power in the battery device 100a. If the battery device 100a stores power of a predetermined amount or more, the battery device 100a supplies the stored power to the cell 20. As such, even in the cells in which the powers are generated according to the different standards, the standards can be converted through the battery device 100a. Therefore, the power can be interchanged between the cells through the battery device 100a.

As in this embodiment, the battery device connecting the cells is configured, so that a scalable power transmission/distribution system including a plurality of cells can be constructed and the cells can be connected without considering a difference of the standards or the protocols of the generated powers. Hereinafter, a connection example of the cells by the battery device according to this embodiment will be described.

Figure 4:
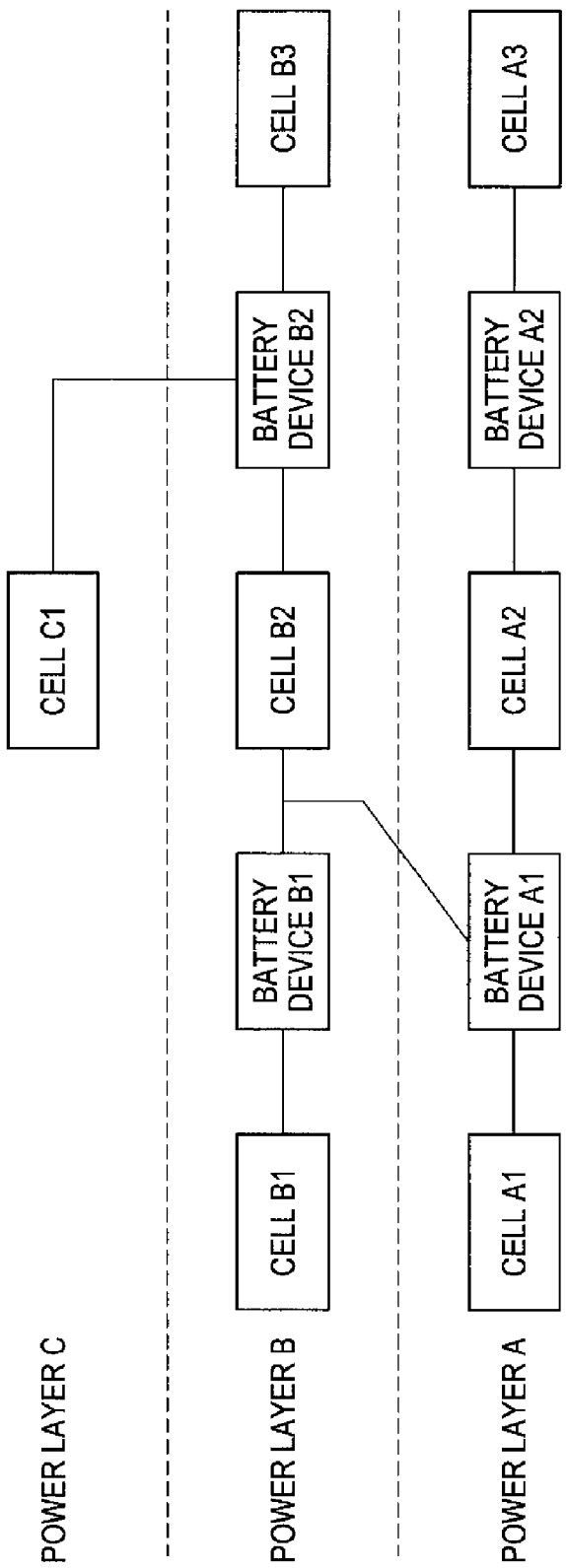
FIG. 4 is a diagram illustrating a connection example of cells by a battery device according to the embodiment of the present disclosure.

FIG. 4 is a diagram illustrating a connection example of the cells by the battery device according to the embodiment of the present disclosure. FIG. 4 illustrates a state in which three power layers A, B, and C exist and cells and battery devices exist in each power layer. In this embodiment, it is assumed that power capacities and voltages are large in order of the power layers A, B, and C. In addition, it is assumed that a communication specification and a communication protocol may be unique in each power layer.

As illustrated in FIG. 4, if cells and battery devices are connected, a battery device A1 is connected to cells A1, A2, and B2. Therefore, the battery device A1 performs a function of relaying the power layers A and B. Even when standards or protocols of powers generated by the power layers A and B are different from each other, if the battery device A1 has the same configuration as that of the battery device 100a illustrated in FIG. 3, the battery device A1 can relay the power layers A and B without considering a difference of the standards or the protocols of the generated powers.

As illustrated in FIG. 4, the battery device A1 can relay the power layers A and B. However, as described above, because the power capacities and the voltages are large in the order of the power layers A, B, and C, the powers according to the different power specifications are supplied to the power layers A and B. If an apparatus to be used by the power layer A is connected to the power layer B, this may cause a trouble.

Therefore, each power layer may have a unique connector as a physical connection mechanism. The battery device A1 may include a connector for connection with the power layer A and a connector for connection with the power layer B. Because the battery device A1 includes the connector for connection with the power layer A and the connector for connection with the power layer B, the different power layers can be prevented from being erroneously connected by the battery device A1. In the case of the same connector, because the connector can be used by the corresponding power layer, the apparatus can be connected without considering the power layer.

Figure 5:
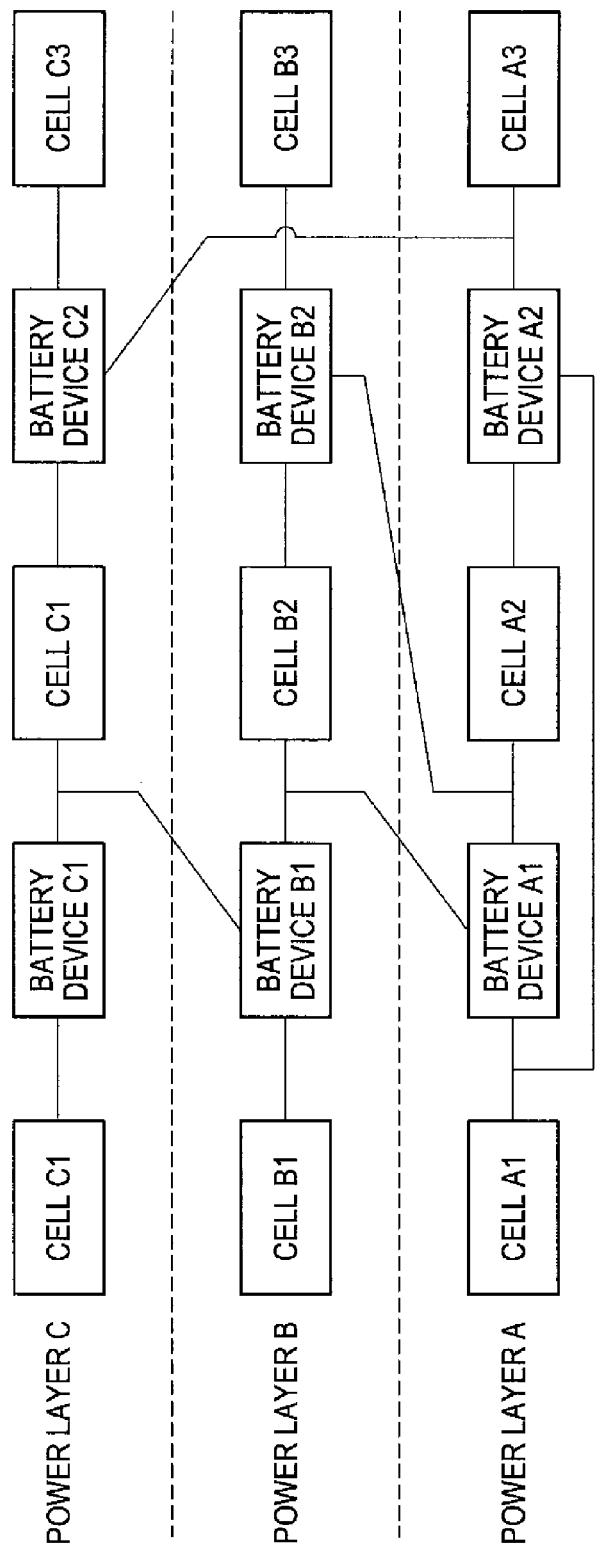
FIG. 5 is a diagram illustrating a connection example of cells by a battery device according to the embodiment of the present disclosure.

FIG. 4 illustrates the case in which the adjacent power layers are relayed by the battery device. However, the present disclosure is not limited to the above example. FIG. 5 is a diagram illustrating a connection example of cells by a battery device according to the embodiment of the present disclosure. Similar to FIG. 4, FIG. 5 illustrates a state in which three power layers A, B, and C exists and cells and battery devices exist in each power layer. In this embodiment, it is assumed that power capacities and voltages are large in order of the power layers A, B, and C. In addition, it is assumed that a communication specification and a communication protocol may be unique in each power layer.

As illustrated in FIG. 5, the battery device can perform a function of relaying the power layers A and C, in addition to a function of relaying the power layers A and B and a function of relaying the power layers B and C. In the connection example illustrated in FIG. 5, the battery devices A1 and A2 are viewed from the cell A1, the battery devices A1 and B2 are viewed from the cell A2, and the battery devices A2 and C2 are viewed from the cell A3. Each cell can perform the power supply and the power reception according to the capacity of the viewed battery device.

Figure 6:
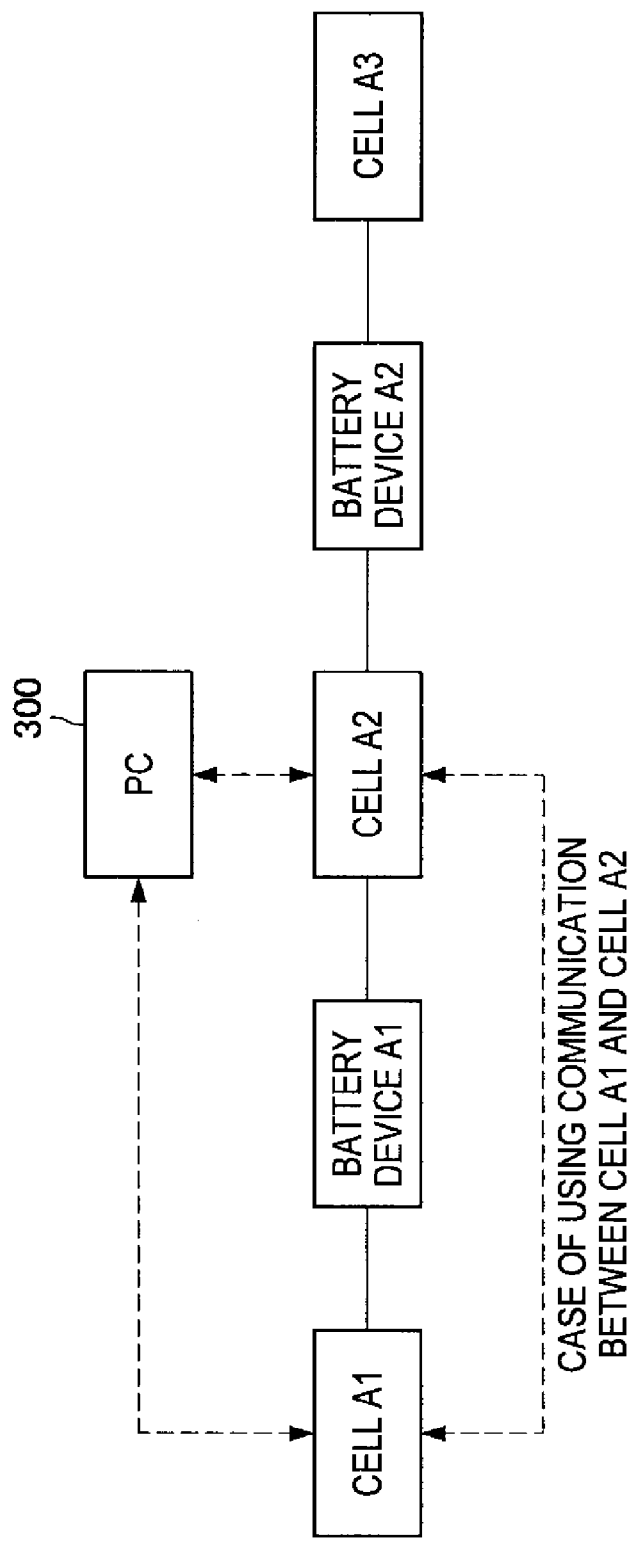
FIG. 6 is a diagram illustrating a connection example of cells by a battery device according to the embodiment of the present disclosure.

FIG. 6 is a diagram illustrating a connection example of cells by a battery device according to the embodiment of the present disclosure. FIG. 6 illustrates a state in which three cells A1, A2, and A3 and two battery devices A1 and A2 exist in a single power layer.

As illustrated in FIG. 6, in the state in which the cells and the battery devices are connected, the battery device A1 is viewed as an energy storage element of each cell, when viewed from both the cells A1 and A2. Therefore, a charge start voltage and a lowest discharge voltage that are determined by each cell exist. The charge start voltage and the lowest discharge voltage are values that are higher than a physical specification of the energy storage element and are lower than a highest charge voltage. If the battery device A1 is used in a state in which the conditions are not satisfied, the battery device A1 may fail.

The charge start voltage of the battery device A1 can be set to a different value in each of the cells A1 and A2. For example, the charge start voltage of the battery device A1 in the cell A1 is set to $V_{a1}$ and the charge start voltage of the battery device A1 in the cell A2 is set to $V_{a2}$.

When the charge start voltage $V_{a1}$ of the battery device A1 in the cell A1 is higher than the charge start voltage $V_{a2}$ of the battery device A1 in the cell A2, that is, $V_{a1}>V_{a2}$, the power moves from the cell A1 to the cell A2. Meanwhile, when the charge start voltage $V_{a1}$ of the battery device A1 in the cell A1 is lower the charge start voltage $V_{a2}$ of the battery device A1 in the cell A2, that is, $V_{a1}<V_{a2}$, the power moves from the cell A2 to the cell A1. That is, the power can be supplied from a large power system to a small power system, according to the magnitude of overall power amounts of the cells A1 and A2. In contrast, the power of the small power system may be supplied to the large power system, such that a sufficient amount of power exists in the large power system.

Of course, the charge start voltage of the battery device A1 may be set to the same value in both the cells A1 and A2. By setting the charge start voltage of the battery device A1 to the same value in both the cells A1 and A2, the voltage can be balanced in both the cells A1 and A2.

The interchange of the power can be realized by only appropriately setting the values of $V_{a1}$ and $V_{a2}$ in advance, even when the communication is not performed between the cells A1 and A2. Of course, the communication may be performed directly between the cells A1 and A2 and the charge start voltage may be set dynamically by a PC 300.

As illustrated in FIG. 6, when setting of the cells A1 and A2 is changed by the PC 300, the configuration in which only the values of the charge start voltages $V_{a1}$ and $V_{at}$ can be set and the other information may not be set by the PC 300 may be used. By using the configuration in which only the values of the charge start voltages $V_{a1}$ and $V_{a2}$ can be set, information to control the cells A1 and A2 can be protected from the outside.

As described above, each of the power layers A and B that are supplied with the powers according to the different power specifications may have a unique connector as a physical connection mechanism. When the battery device is connected between the power layers supplied with the powers according to the different power specifications, the battery device may include a connector for connection with the power layer A and a connector for connection with the power layer B.

Figure 7:
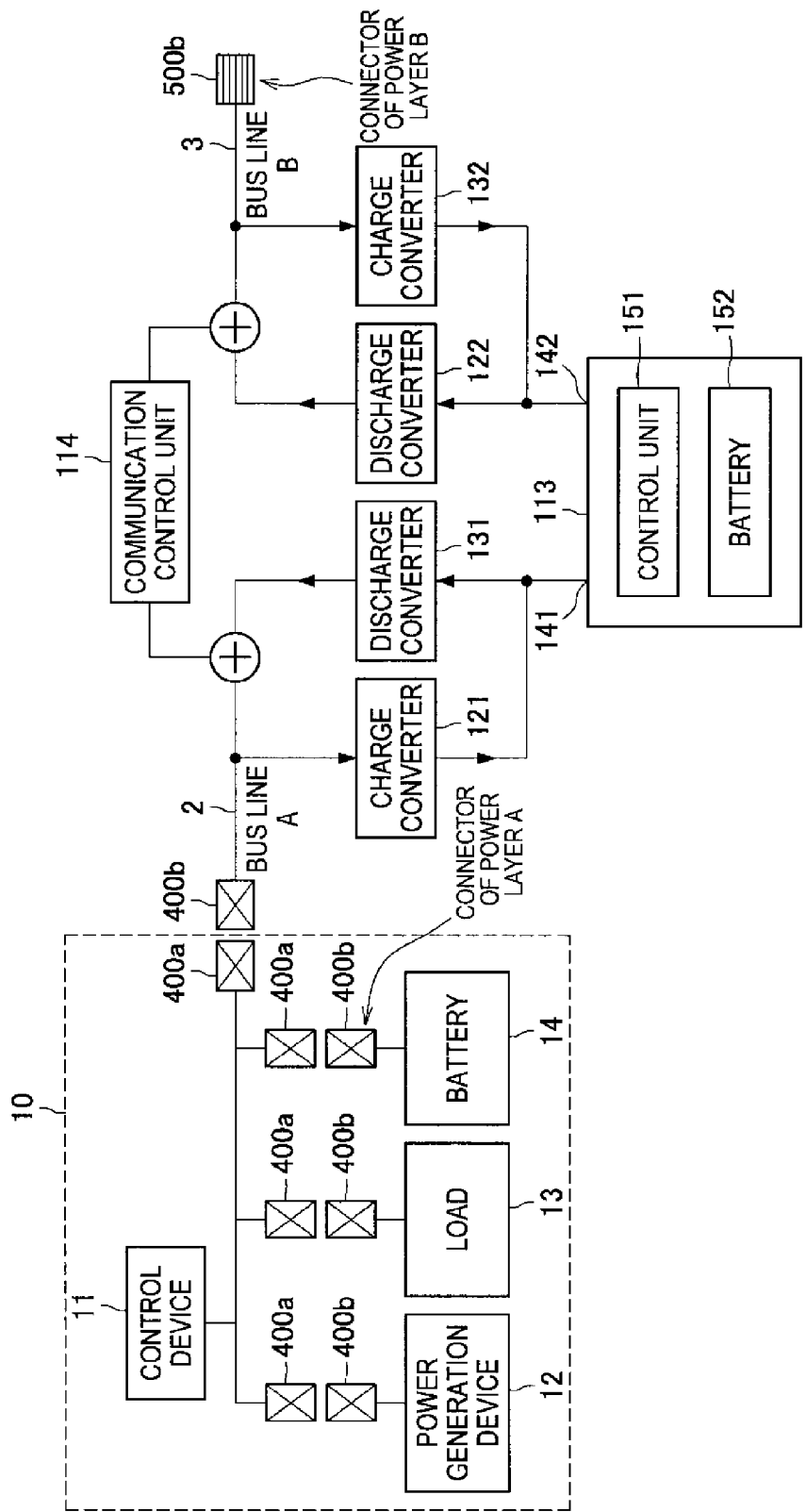
FIG. 7 is a diagram illustrating a state in which the cell 10 and the battery device 100a are connected to each other.

FIG. 7 is a diagram illustrating a state in which the cell 10 and the battery device 100a are connected. The cell 10 and the battery device 100a are connected by connectors 400a and 400b having a predetermined shape. The devices that form the cell 10 are connected to the bus line 2 by the same connectors 400a and 400b. As such, the devices that are suitable for the power specification of the cell 10 can be connected by the same connectors 400a and 400b.

Meanwhile, the battery device 100a includes a connector 500b separately. The connector 500b is a connector for connection with the power layer including the cell supplied with the power according to the power specification different from the power specification of the cell 10. There is no compatibility between the connectors 400b and 500b and the connector 500b may not be connected to the connector 400a, and vice versa. As such, the connector compatibility is made not to exist between the power layers supplied with the powers according to the different power specifications, so that power of a non-used standard can be prevented from being supplied to the cell and a trouble such as a failure of the device in the cell can be prevented.

The connectors have a structure in which bidirectional power transmission is enabled. In particular, the connector 400b provided in the battery device 100a is configured such that the bidirectional power transmission is enabled. Meanwhile, the power generation device or the load may have a structure in which unidirectional power transmission is enabled. In this case, the bidirectional means that electrodes are covered with an insulating material and short-circuiting between the electrodes is prevented in a state in which the connector is pulled out and a semiconductor switch can perform a bidirectional operation when the semiconductor switch is used together with the connector.

(Application Example of Power Transmission/Distribution System)

When there are a plurality of power layers, a certain power layer may have maximum power and a maximum voltage in a generally assumed safe range. In an example illustrated in FIG. 7, the connectors 400a and 400b that are used by the cell 10 are used exclusively for a certain power layer. Requested are not special qualifications at the time of power generation, power transmission/distribution, power consumption, and power storage such as a construction, a design, execution, and maintenance of the cell 10, as long as the connectors are used.

In the generally assumed safe range, a maximum voltage is 20 V and a maximum current is 5 A. The current restriction may be executed by a current restriction circuit prepared in the control device of each cell, a fuse prepared in the connector, or both the current restriction circuit and the fuse. With regard to the current restriction, because a simple mechanism called the fuse is generally used conventionally, a technical preparation is completed with respect to securing of the safety by the fuse. The voltage should have a level at which people are not affected by electricity. For example, if the voltage is 20 V or less, the people are not affected by the electricity.

Figure 8:
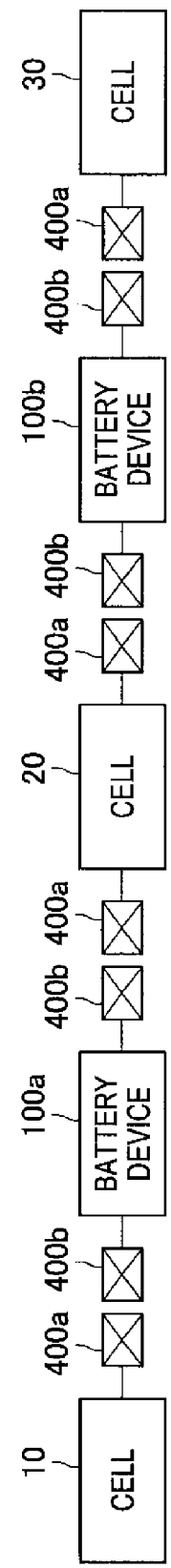
FIG. 8 is a diagram illustrating a connection example of cells by a battery device according to the embodiment of the present disclosure.

If one power management system (cell) is constructed under the restriction, a maximum of power of 100 W can be managed in the cell. However, if a plurality of cells are prepared, managed overall power is not restricted. FIG. 8 is a diagram illustrating a connection example of cells by a battery device according to the embodiment of the present disclosure. If the cells are connected as illustrated in FIG. 8, the power can be interchanged. If a plurality of cells that can supply a maximum of power of 100 W are integrated, the large overall power can be managed without qualifications.

Figure 9:
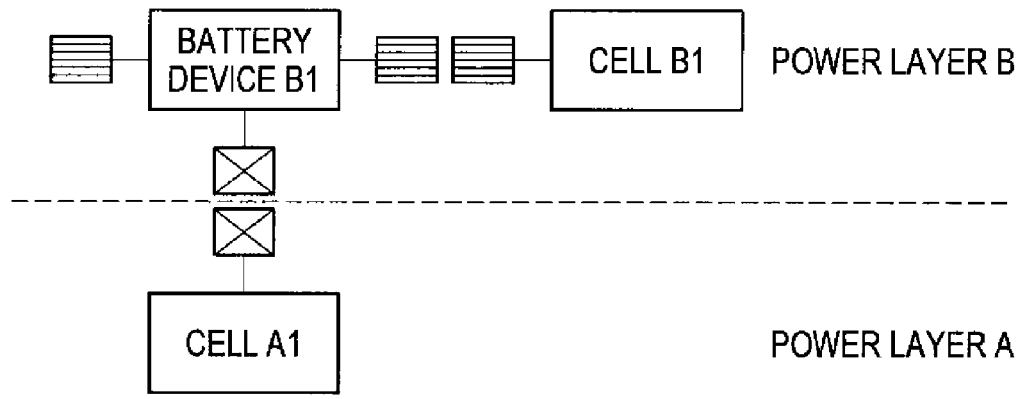
FIG. 9 is a diagram illustrating a connection example of cells by a battery device according to the embodiment of the present disclosure.

Meanwhile, a cell that belongs to a certain power layer can be connected to an upper power layer through the battery device according to the embodiment of the present disclosure. FIG. 9 is a diagram illustrating a connection example of cells by a battery device according to the embodiment of the present disclosure. For example, the power layer A is set as a layer that can be used without special qualifications at the time of power generation, power transmission/distribution, power consumption, and power storage such as a construction, a design, execution, and maintenance, and the powered layer B is set as a layer that has the qualifications. With regard to the power layer B, a specialized supplier lays a line like a current in-home light line and any number of cells belonging to the power layer A can be connected to a connection point of the power layer B.

With regard to the power layer A, a power restriction of 100 W is set to each cell. From the power layer B, it is determined that power of 100 W increases. The power generated by the power layer A can be transmitted to the power layer B through the battery device and the power can be consumed by the power layer B. Because a connector used to connect the power layer A and the power layer B can perform bidirectional power transmission and has a small amount of power, a small and light connector can be used as the connector. Of course, the power generated by the power layer A can be consumed in the power layer A. If a network is configured by the power layer A and connection points with the power layer B are increased, total power of the power layer A and the power layer B can be increased.

Figure 10:
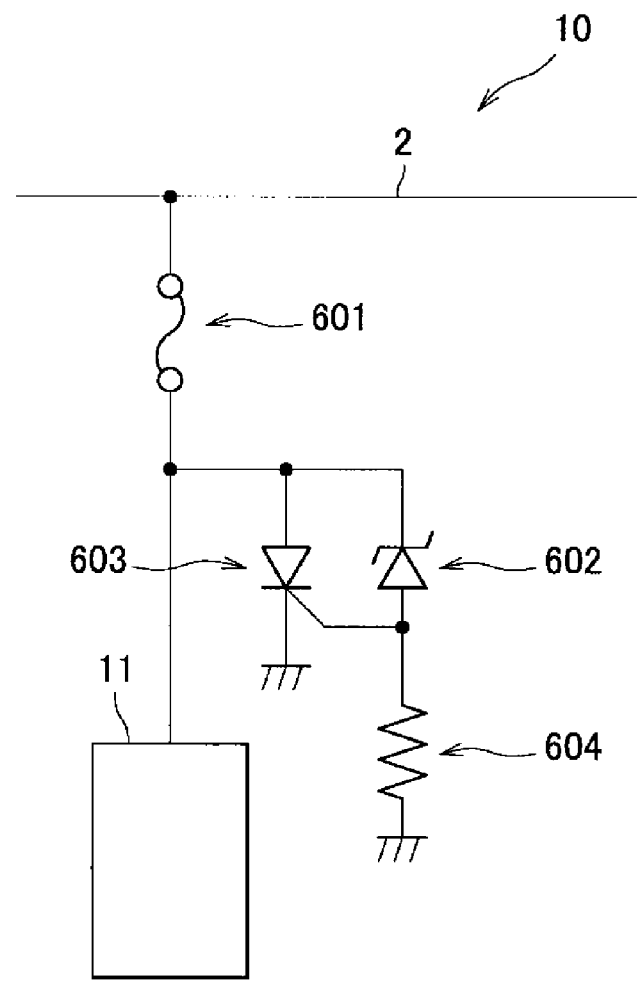
FIG. 10 is a diagram illustrating an example of a current/voltage restriction configuration provided in each cell.

FIG. 10 is a diagram illustrating a configuration example of a current/voltage restriction mechanism provided in each cell. In this case, an example of a configuration that is provided in the cell 10 and is used to restrict the current and the voltage is illustrated. FIG. 10 illustrates a current fuse 601, a voltage detecting zener diode 602, a thyristor 603, and a resistor 604 as the configuration to restrict the current and the voltage. A bus line 2 and a control device 11 connected to the bus line 2 are illustrated in FIG. 10.

When the voltage of the bus line 2 is a rated voltage or less, the zener diode 602 is completely cut off and the current does not flow to the resistor 604. Therefore, a gate voltage of the thyristor 603 is 0 V and the thyristor 603 is cut off. If the voltage of the bus line 2 becomes a zener voltage or more, the current starts to flow to the resistor 604, the voltage is applied to a gate of the thyristor 603, and the thyristor 603 is turned on. In this case, the current fuse 601 is cut by an overcurrent, which results in preventing a high voltage from being continuously generated on the bus line 2. The current fuse 601 also becomes an overcurrent measure of the control device 11. This measure supports the purely electronic current and voltage restrictions necessary for the control device 11. Therefore, a simplest method is preferable.

2. Summary

As described above, according to the embodiment of the present disclosure, the battery device that connects the cells using the powers generated according to the different standards is provided. The battery device includes the battery to store the power generated by the cell and the voltage converting unit to convert the voltage according to the standard of the battery. The battery includes the plurality of power input/output ports for connection with the bus line to supply the power in the cells.

Because the battery device that connects the cells using the powers generated according to the different standards has the configuration described above, the battery can connect the cells using the powers generated according to the different standards and the power can be interchanged between the connected cells.

The battery device according to the embodiment of the present disclosure can connect the power layers in which the powers are generated according to the different standards. Because the battery device connects the power layers in which the powers are generated according to the different standards, the power can be interchanged from a certain power layer to another power layer. For example, a plurality of power layers generating a small amount of power are connected and the plurality of power layers and upper layers of the plurality of power layers are connected by the battery device according to the embodiment of the present disclosure. As a result, the power can be supplied from the upper power layers to the lower power layers, small amounts of powers can be collected, and the power can be supplied to the upper power layers.

In the preferred embodiment of the present disclosure described above, the power that is generated by the power generation device is the alternating current. However, the power that is generated by the power generation device is not limited to the alternating current and the preferred embodiment of the present disclosure described above can be embodied even when the power is the direct current.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Additionally, the present technology may also be configured as below.

(1)
A battery device comprising:
a plurality of power converters; and
a power storage unit connected between the power converters,
wherein the power converters and the power storage unit are configured to convert power from a first power standard to a second power standard by transferring the power through the power storage unit.

(2)
A battery device according to (1), further comprising:
a plurality of power input/output ports connecting the power storage unit to each of the power converters.

(3)
A battery device according to (2), wherein each of the power input/output ports includes unique identification information.

(4)
A battery device according to (1), wherein a first power converter is connected to a first power cell configured according to the first power standard, and a second power converter is connected to a second power cell configured according to the second power standard.

(5)
A battery device according to (4), further comprising a plurality of communication lines, each configured to supply power having a different power standard and enable communication between the first and second power cells.

(6)
A battery device according to (4), further comprising a communication control unit connected to each of the power converters.

(7)
A battery device according to (6), wherein the communication control unit is configured to relay communication between the first power cell and the second power cell, and to convert between any differences in communication protocol between the first power cell and the second power cell.

(8)
A battery device according to (7), wherein the communication control unit is further configured to detect an address provided from a control device of the first or second power cells, and to store information regarding a connection state of the battery device with the respective first or second power cell.

(9)
A battery device according to (1), wherein each of the power converters includes a charge converter and a discharge converter.

(10)
A battery device according to (1), wherein the first power standard is different than the second power standard.

(11)
A battery device according to (1), wherein the power storage unit includes a control unit and a battery, the control unit configured to control an operation of the battery device, and to control charging and discharging with respect to the battery device.

(12)
A battery device according to (1), wherein
each power converter is connected to a separate power cell and includes
a charge converter configured to
receive power transmitted from a first one of the power cells according to the first power standard,
convert the received power to a power standard of the power storage unit, and transmit the converted power to the power storage unit, and a discharge converter configured to
receive power transmitted from the power storage unit according to the power standard of the power storage unit,
convert the received power to the second power standard, and
transmit the converted power to a second one of the power cells.

(13)
A battery device according to (1), further comprising a plurality of different connectors configured to connect with power cells having different power standards, each connector having a different connection shape.

(14)
A battery system comprising:
a plurality of power cells; and
a battery device connected between the power cells, each battery device including
a plurality of power converters, and
a power storage unit connected between the power converters,
wherein the power converters and the power storage unit are configured to convert power from a first power standard according to a first power cell to a second power standard according to a second power cell by transferring the power through the power storage unit.

(15)
A battery system according to (14), wherein the battery device further includes:
a plurality of power input/output ports connecting the power storage unit to each of the power converters.

(16)
A battery system according to (15), wherein each of the power input/output ports includes unique identification information.

(17)
A battery system according to (14), wherein the battery device further includes a plurality of communication lines, each configured to supply power having a different power standard and enable communication between the first and second power cells.

(18)
A battery system according to (14), wherein the battery device further includes a communication control unit connected to each of the power converters.

(19)
A battery system according to (18), wherein the communication control unit is configured to relay communication between the first power cell and the second power cell, and to convert between any differences in communication protocol between the first power cell and the second power cell.

(20)
A battery system according to (19), wherein the communication control unit is further configured to detect an address provided from a control device of the first or second power cells, and to store information regarding a connection state of the battery device with the respective first or second power cell.
(21)
A battery system according to (14), wherein each of the power converters includes a charge converter and a discharge converter.
(22)
A battery system according to (14), wherein the first power standard is different than the second power standard.
(23)
A battery system according to (14), wherein the power storage unit includes a control unit and a battery, the control unit configured to control an operation of the battery device, and to control charging and discharging with respect to the battery device.
(24)
A battery system according to (14), wherein
each power converter is connected to a separate power cell and includes
a charge converter configured to
receive power transmitted from a first one of the power cells according to the first power standard,
convert the received power to a power standard of the power storage unit, and
transmit the converted power to the power storage unit, and
a discharge converter configured to
receive power transmitted from the power storage unit according to the power standard of the power storage unit,
convert the received power to the second power standard, and
transmit the converted power to a second one of the power cells.
(25)
A battery system according to (14), wherein the battery device further includes a plurality of different connectors configured to connect with a first one of the power cells and a second one of the power cells, each power cell having different power standards, and each connector having a different connection shape.
(26)
A battery system according to (14), wherein each power cell includes:
a power source configured to generate power;
a load configured to consume power generated by the power source;
a power line configured to supply power from the power source to the load;
a power storage device configured to store power generated by the power source; and
a communication line that enables communication between the power source, the load, and the battery device.
(27)
A method of converting power via a power storage unit, the method comprising:
converting power from a first power standard;
storing the converted power in a power storage unit; and
converting the previously stored power to a second power standard.
(28)
A method according to (27), further comprising:
providing a battery device including a communication control unit and the power storage unit; and
communicating between a first power cell that operates according to a first communication specification and the first power standard, and a second power cell that operates according to a second communication specification and the second power standard.
(29)
A method according to (28), further comprising:
detecting, with the communication control unit, an address provided from a control device of the first or second power cells; and
storing information regarding a connection state of the battery device with the first or second power cells.
(30)
A method according to (28), further comprising transmitting power management information of the battery device to at least one of the first power cell and the second power cell.
(31)
A method according to (32), wherein the power management information includes at least one selected from the group consisting of a charge current of the power storage unit, a charge voltage of the power storage unit, and a charge amount of the power storage unit.
(32)
A method according to (27), wherein the first power standard is different than the second power standard.
(33)
A method according to (27), wherein
converting the power from the first power standard includes receiving power transmitted from a first power cell that operates according to the first power standard,
converting the received power to a power standard of the power storage unit, and
storing the converted power in the power storage unit.
(34)
A battery device including:
a power storage unit that stores power;
a plurality of power converting units each of which is connected to a power line supplied with power according to a predetermined standard and converts the power supplied to the power line into power according to a standard of the power storage unit; and
a plurality of power input/output units each of which is paired with each of the power converting unit, such that power is input and output between the power converting unit and the power storage unit.
(35)
The battery device according to (34),
wherein each of the plurality of power converting units is connected to the power line supplied with power according to a different standard.
(36)
The battery device according to (34) or (35), further including:
a communication control unit that converts communication between devices connected to the power line into communication between devices connected to another power line.
(37)
The battery device according to any one of (34) to (36), wherein each of the power input/output units has unique identification information.
(38)
The battery device according to any one of (34) to (37), further including:
a connector that is connected to the power line.

(39)
The battery device according to (38),
wherein a shape of the connector is determined according to a standard of the power supplied to the power line.
(40)
The battery device according to (38) or (39),
wherein the connector does not have compatibility between different power standards
(41)
The battery device according to any one of (38) to (40),
wherein the connector includes a power intercepting unit that intercepts power from the power line, when power out of the standard of the power supplied by the power line is generated in the power line.
(42)
The battery device according to any one of (34) to (41),
wherein power transmission with the power line is performed by wireless.

REFERENCE SIGNS LIST

1 Power transmission/distribution system
10 Cell
11 Control device
12 Power generation device
13 Load
14 Battery device
15 Power line
16 Communication line
20 Cell
30 Cell
100a, 100b Battery device
111, 112 Power converting unit
113 Power storage unit
114 Communication control unit
121, 122 Charge converter
131, 132 Discharge converter
141, 142 Power input/output port
151 Control unit
152 Battery
400a, 400b, 500b Connector
601 Fuse
601 Current fuse
602 Zener diode
602 Voltage detecting zener diode
603 Thyristor
604 Resistor

The invention claimed is:

1. A battery device, comprising:
a plurality of power converters;
a power storage unit connected between two pairs of the plurality of power converters,
wherein the plurality of power converters and the power storage unit are configured to convert power from a first determined power standard to a second determined power standard by transfer of the power through the power storage unit; and
a plurality of power input/output ports configured to connect the power storage unit to each of the plurality of power converters.

2. The battery device according to claim 1, wherein each of the plurality of power input/output ports includes unique identification information.

3. The battery device according to claim 1, wherein a first power converter of the plurality of power converters is connected to a first power cell configured based on the first determined power standard, and a second power converter of the plurality of power converters is connected to a second power cell configured based on the second determined power standard.

4. The battery device according to claim 3, further comprising a plurality of communication lines, each configured to supply power of a different determined power standard and enable communication between the first and second power cells.

5. The battery device according to claim 3, further comprising a communication control unit connected to each of the plurality of power converters.

6. The battery device according to claim 5, wherein the communication control unit is configured to relay communication between the first power cell and the second power cell, and convert between differences in communication protocol between the first power cell and the second power cell.

7. The battery device according to claim 6, wherein the communication control unit is further configured to detect an address provided from a control device of the first or second power cells, and store information related to a connection state of the battery device with the respective first or second power cell.

8. The battery device according to claim 1, wherein each of the two pairs of the plurality of power converters includes a charge converter and a discharge converter.

9. The battery device according to claim 1, wherein the first determined power standard is different from the second determined power standard.

10. The battery device according to claim 1, wherein the power storage unit includes a control unit and a battery, the control unit configured to control an operation of the battery device, and control charging and discharging with respect to the battery device.

11. The battery device according to claim 1, wherein
each of the plurality of power converters is connected to
a separate power cell and includes a charge converter configured to:
receive power transmitted from a first one of the power cells based on the first determined power standard,
convert the received power to a determined power standard of the power storage unit, and
transmit the converted power to the power storage unit, and a discharge converter configured to:
receive power transmitted from the power storage unit based on the determined power standard of the power storage unit,
convert the received power to the second determined power standard, and
transmit the converted power to a second one of the power cells.

12. The battery device according to claim 1, further comprising a plurality of connectors configured to connect with power cells that have different determined power standards, wherein each of the plurality of connectors has a different connection shape.

13. A battery system, comprising:
a plurality of power cells; and
a battery device connected between a pair of the plurality of power cells, wherein the battery device includes:
a plurality of power converters;
a power storage unit connected between two pairs of the plurality of power converters,
wherein the plurality of power converters and the power storage unit are configured to convert power from a first determined power standard based on a first power cell of the plurality of power cells to a second determined power standard based on a second power cell of the plurality of power cells by transfer of the power through the power storage unit; and a plurality of power input/output ports configured to connect the power storage unit to each of the plurality of power converters.

14. The battery system according to claim 13, wherein the battery device further includes a plurality of communication lines, each configured to supply power that has a different determined power standard and enable communication between the first and second power cells.

15. The battery system according to claim 13, wherein each of the plurality of power converters is connected to a separate power cell and includes:
a charge converter configured to:
receive power transmitted from a first one of the power cells based on the determined first power standard;
convert the received power to a determined power standard of the power storage unit; and
transmit the converted power to the power storage unit; and
a discharge converter configured to:
receive power transmitted from the power storage unit based on the determined power standard of the power storage unit;
convert the received power to the second determined power standard; and
transmit the converted power to a second one of the power cells.

16. The battery system according to claim 13, wherein each plurality of power cells includes:
a power source configured to generate power;
a load configured to consume power generated by the power source;
a power line configured to supply power from the power source to the load;

a power storage device configured to store power generated by the power source; and
a communication line configured to enable communication between the power source, the load, and the battery device.

17. A method of converting power, the method comprising:
converting power using a first pair of a plurality of power converters to a first determined power standard;
storing the converted power in a power storage unit connected between the first pair and a second pair of the plurality of power converters,
wherein a plurality of power input/output ports are configured to connect the power storage unit to the first pair and the second pair of the plurality of power converters; and
converting the stored power to a second determined power standard using a second pair of the plurality of power converters.

18. The method according to claim 17, further comprising:
providing a battery device including a communication control unit and the power storage unit; and
communicating between a first power cell configured to operate based on a first communication specification and the first determined power standard, and a second power cell configured to operate based on a second communication specification and the second determined power standard.

19. The method according to claim 18, further comprising:
detecting, with the communication control unit, an address provided from a control device of the first or second power cells; and
storing information regarding a connection state of the battery device with the first or second power cells.

* * * * *